Jan. 19, 1926.
R. CHILTON
1,570,334
GASKET FOR PRESSURE CONTAINERS
Filed Sept. 15, 1921
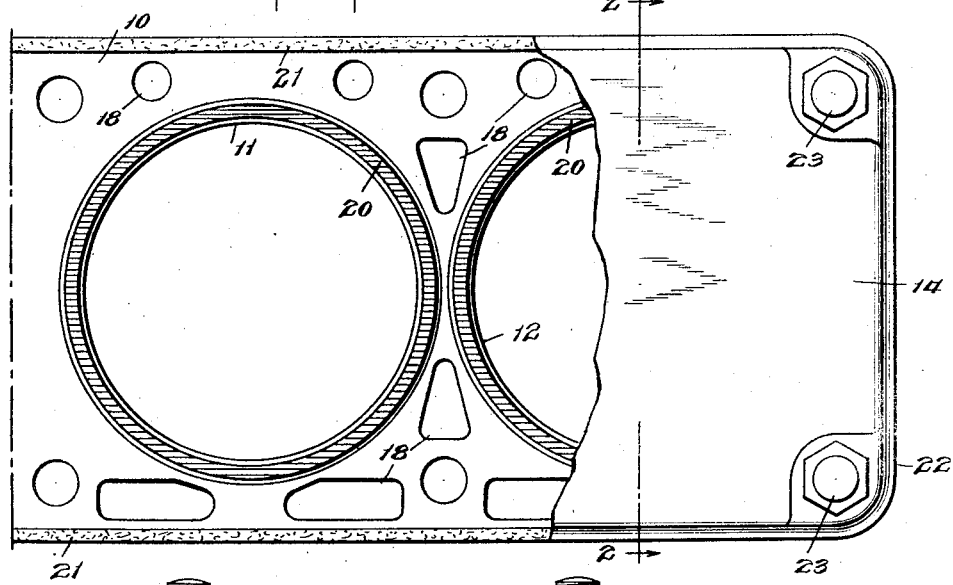
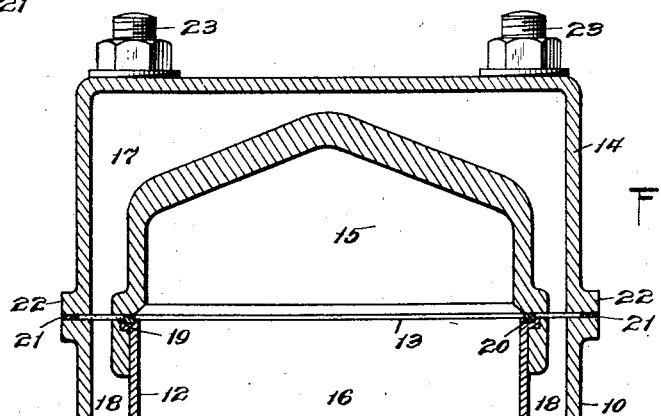
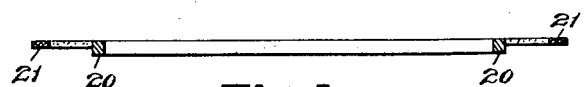
INVENTOR
Roland Chilton
BY
Warren S. Orton
ATTORNEY Patented Jan. 19, 1926.

1,570,334

UNITED STATES PATENT OFFICE.

ROLAND CHILTON, OF KEYPORT, NEW JERSEY, ASSIGNOR TO AEROMARINE PLANE & MOTOR COMPANY, A CORPORATION OF NEW YORK.

GASKET FOR PRESSURE CONTAINERS.

Application filed September 15, 1921. Serial No. 500,806.

*To all whom it may concern:*

Be it known that I, ROLAND CHILTON, a subject of the King of Great Britain, and resident of Keyport, in the county of Monmouth and State of New Jersey, have invented certain new and useful Improvements in Gaskets for Pressure Containers, of which the following is a specification.

The invention relates in general to a gasket construction for use in sealing a joint in those situations where conduits containing different pressures pass across the joint, and the invention specifically relates to an improvement for securing the head to a detachable head motor and particularly to a means for sealing the joint between the body of the motor and its head to prevent leakage from the high pressure gas containing explosion chamber into external spaces and to prevent leakage of water from the relatively low pressure containing water spaces found in internal combustion engines.

It is understood that in order to prevent leakage from the explosion chamber of an engine any sealing means at the joints must be capable of resisting the pressure of the gases therein which not infrequently are in excess of a thousand pounds per square inch. On the contrary the sealing means for enclosing the water space is required simply to resist the pressure of the water which is usually only a few pounds. It has been the practice in such situations to position a single sheet gasket, usually of copper and asbestos, across the joint to seal both the explosion chamber and water space by bolt pressure acting through the head. This practice has not been found to be satisfactory, especially when dealing with the sealing of combustion chambers and other conduits having extremely high pressures, for in attempts to provide the necessary compression over the relatively large areas of the packing to hold these high pressures, excessive loads must be placed on the holding bolts. Aside from this the available bolt pressure is partially diverted to holding the water seal under high compression and this high compression is not only unnecessary to confine the low pressure water contained in the water space but is otherwise objectionable.

Again the usual copper asbestos gaskets are not capable of withstanding any locally applied high squeezing action and as the bores of such gaskets are in contact with the explosion in the combustion chamber of engines they are subject to very high temperatures with resulting burning or disintegration of the gasket.

Accordingly, the primary object of the invention is to provide a simple construction for sealing a joint in such a way as will distribute the available pressure on the seal and apportion the pressure in accordance with the requirement necessary to resist the pressures which tend to create leakage past the joint. In the case of the water-jacketed engine this is attained by concentrating the bolt pressure onto a thin gasket about the combustion chamber leaving just sufficient pressure on the sealing means about the water, or low pressure space, for the necessary closure to defeat water leakage.

In most internal combustion engines the explosion chamber is surrounded or at least partially surrounded by the water containing space and the only available place for positioning the holding bolts is to the outside of the water space. Due to the spring of the material there is frequently caused a deflection in both the cylinder and cylinder head when the bolts are tightened up, which deflection acts to throw a predominence of pressure on the water sealing joint where it is not needed rather than on the explosion chamber joint where it is most needed.

Accordingly, another object of the invention is to provide a construction of sealing means in an engine of the type outlined and in which the pressures are localized on the explosion chamber seal when the bolts are tightened up.

I attain this phase of the invention by positioning rings of relatively small cross-sectional area and formed of difficultly compressible material, such as soft metal, about the combustion chamber and positioning a packing of some soft, easily compressible material at the water joint and then forcing a closure such as the cylinder head into bearing engagement with both the metal ring and the soft packing.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:—

Figure 1 is a plan view looking down on a part of an internal combustion engine with part of the head removed to show a preferred embodiment of the invention in plan;

Figure 2 is a vertical transverse sectional view taken on the line 2—2 of Figure 1;

Figure 3 is a sectional view through the gaskets in their original form and slightly separated from each other; and Figure 4 is a similar view showing the configuration of the gaskets after they have been compressed and in their operative relative position.

The type of engine now employed in aeroplane power plants is illustrated in the accompanying drawings so as to feature a situation where extremely high gas pressure is present as in the explosion chamber and in proximity to a low pressure chamber represented by the water spaces, and in this way illustrates the applicability of the invention to situations where variable pressures are to be confined by a single holding means.

In the following description and in the claims, parts will be identified by specific names for convenience of expression but they are intended to be as generic in their application to similar parts as the art will permit.

In the drawings there is shown a body or engine casing portion 10, containing explosion cylinders, two of which 11 and 12 are shown exposed at the upper end 13 of the casing. This end is closed by a head 14 usually of one piece which fits across the entire top of the casing. Referring to any one of the cylinders such as the cylinder 12 it is seen that the part of the head above the same is provided with a space 15 constituting an extension of the combustion chamber 16 and is provided with a water space 17 opened to the water space in the casing through water holes 18 formed therein as is usual in such constructions. The exposed end of the cylinder is provided with a non-circular groove 19 herein shown to be rectangular in cross-section. A soft metal ring 20 originally circular in cross-section as shown in Figure 3 and having a greater cross-sectional area than the corresponding area of the groove is positioned in the groove and projects above the upper exposed end of a cylinder. It is within the scope of this disclosure to omit the groove and to give some other form, such as a flat or triangular form to the gasket and which gasket in this case rests on the flat surface at the exposed end of the cylinder.

Leakage from the water space to the exterior of the device is prevented by positioning a readily compressible packing 21 preferably of cork or rubber, between the upper edge of the casing 10 and the rim 22 of the head which faces the same. Fastening bolts 23 are passed through an outlining flange 22 projecting from the head and are passed into the body portion 10 to secure the head in position on the casing.

In operation, the soft metal ring is laid in the groove and in the case where several cylinders are employed these rings are positioned in the groove about each of the cylinders. The soft readily compressible packing or gasket is positioned at the outer edge of the casing in position to be clamped between the casing and rim 22 as the head is forced into position. The head is disposed in position and the bolts tightened. The final movement of the bolt tightening operation will cause the head to bear forcefully on the metal ring gasket forcing the same into the groove and distorting the ring from its circular shape into a shape to conform to the configuration of the groove. The excess material of the metal ring will leave a small portion projecting above the level of the casing and in this way compensate for any variations in fit between the casing and its head. At the same time the head bears on the water jacketed gasket compressing the same to an extent sufficient to prevent water leakage from the enclosed water space.

The small top area of the metal gasket permits a close positioning of the cylinders as is required in engines for aviation duty and at the same time minimizes the danger of one cylinder blowing out into an adjacent cylinder across the narrow surface between the cylinders.

It is obviously within the scope of this disclosure to position the packing 21 in a groove similar to the groove 19 to hold the two types of sealing means in preset relative position, or the gaskets may be otherwise preset, even in the absence of any grooves, as by forming the gaskets in one-piece, such for instance as part of a formed sheet positioned between the cylinders and the head or the gaskets may be mounted on a sheet which is afterwards cut away over the explosion and water chambers.

The elastic water sealing packing is preferably thicker than the ductile head-supporting explosion rings and is, therefore, subject to relatively great reduction of thickness when the head is bolted down thereby maintaining an intimate sealing contact in spite of inaccuracy and distortion of the head and cylinders.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In an internal combustion engine, the combination of a body portion and a detachable head in engagement therewith to form a joint, said body portion provided with an explosion chamber and with a water space, both chamber and space being exposed to the joint, a soft metal gasket in the joint and encircling the explosion chamber and a non-metallic gasket in the joint surrounding the water space and fastening means for securing the head to the body portion, said fastening means acting to compress both the metal gasket and the non-metallic gasket between the body portion and the head.

2. In a device of the class described, the combination of two members, each provided with two conduits communicating across the joint formed between the member, one of the conduits intended to have a fluid therein under high pressure and the other conduit intended to have a fluid therein under relatively low pressure, a narrow ring of a material which resists compression disposed in the joint between the members and surrounding the high pressure containing conduit and a gasket of relatively easily compressible material in the joint between the members and surrounding the low pressure containing conduit and a set of bolts for causing the two members to approach each other thereby to compress both gaskets in position.

3. In a device of the class described, the combination of two members, each provided with two conduits communicating across the joint formed between the members, one of the conduits intended to have a fluid therein under relatively high pressure and the other conduit intended to have a fluid therein under relatively low pressure, a metal ring disposed in the joint between the members and surrounding the high pressure containing conduit and a relatively soft packing disposed in the joint between the members and surrounding the low pressure containing conduit and means for compressing the metal ring and packing in position.

4. In a device for sealing a joint between two members, the combination with two members forming a joint, of a plurality of gaskets disposed in the joint and in parallel planes, one of said gaskets constituting a thin metal ring and another gasket constituting a relatively soft packing and means for forcing the members into position to compress the gaskets between the same in a direction transversely of the plane of the joint and thus seal the joint, said metal ring providing the maximum resistance offered by the gaskets to the compressing movement of said means.

5. In a detachable head motor, the combination of a cylinder having an explosion chamber and a water space substantially surrounding the explosion chamber and both exposed at one end of the cylinder, a head for closing said end, a difficultly distortable gasket encircling the explosion chamber and disposed between the cylinder and head, a relatively easily distortable gasket between the water space and the exterior of the motor and bolts positioned to the outside of the water space and acting through the head on to the gasket about the explosion chamber to seal the explosion chamber against the escape of the relatively high pressure fluids therein and onto the gasket about the water space to close the same against the escape of the low pressure water therein.

6. In a detachable head motor, the combination of a cylinder having an explosion chamber and a water space substantially surrounding the chamber and both exposed at one end of the chamber, a head for closing said end, said end of the cylinder provided with a groove non-circular in cross-section and encircling the explosion chamber, a metal ring originally circular in cross-section and having a greater cross-sectional area than the similar area of the groove disposed in said groove and projecting therefrom, an easily compressible packing disposed between the cylinder and head and encircling the water space and means for forcing the head towards the cylinder thereby to force the metal ring into the groove and to compress the packing.

7. In an internal combustion engine, the combination of a cylinder and a bolted-on head, a ductile explosion sealing ring disposed between the cylinder and head adapted to distort under and when in distorted condition to sustain the bolting up pressure and a compressible gasket disposed between the cylinder and head offset from the first named ring and adapted to be compressed therebetween without intentionally resisting the bolting-up pressure.

8. In an internal combustion engine, the combination with a cylinder and a bolted-on head, of two gaskets positioned between the cylinder and head, one of said gaskets being ductile and distortable under the bolting up pressure, and when so distorted capable of offering a substantial resistance to the bolting up pressures and to the high pressures within the cylinder and the other gasket being readily distortable under the bolting up pressures, and offering relatively slight resistance to the bolting up pressures.

9. In a device of the class described, the combination with two members disposed in juxtaposition and means for forcing the same towards each other, of two distortable gaskets between the members and one disposed within the outlines of the other and acting to constitute a seal, one of said gaskets offering relatively high resistance to distortion and thus offering relative great resistance to the action of said means, and the other gasket offering relatively slight resistance to said means.

10. In an internal combustion engine, the combination with a water-jacketed engine cylinder, a head therefor and securing means for moving the head towards the cylinder, of a narrow ductile sealing ring disposed between the cylinder and head for sealing the explosion chamber and for sustaining the pressure from said means and an elastic washer for sealing the water containing space and offering relatively slight resistance to the action of said means.

11. A sealing means for use in an internal combustion engine between the cylinder and a bolted on head, said means constituting an article of manufacture per se and comprising a ductile explosion resisting ring adapted to be disposed between the cylinder and the head designed to distort under and when in distorted condition to sustain the bolting up pressure, and a compressible gasket adapted to be disposed between the cylinder and head and designed to be compressed therebetween without intentionally resisting the bolting-up pressure.

Signed at Keyport in the county of Monmouth and State of New Jersey this thirtieth day of August, A. D., 1921.

ROLAND CHILTON.